Witnesses
Eugene C. Kennedy
Joseph R. Rohrer

Inventors.
Joseph P. Owens
George Cooper, by
Hem Heidman & Hallopp
Attorneys

No. 781,616.                                                    Patented January 31, 1905.

UNITED STATES PATENT OFFICE.

JOSEPH P. OWENS, OF LEBANON, AND GEORGE COOPER, OF SOUTH LEBANON, OHIO.

CORN-SILKING MACHINE.

SPECIFICATION forming part of Letters Patent No. 781,616, dated January 31, 1905.

Application filed November 21, 1904. Serial No. 233,755.

*To all whom it may concern:*

Be it known that we, JOSEPH P. OWENS, a resident of Lebanon, and GEORGE COOPER, a resident of South Lebanon, in the county of Warren and State of Ohio, citizens of the United States, have invented a certain new and useful Improvement in Corn - Silking Machines, of which the following is a full, clear, and exact description, reference being had to the accompanying drawings, which form a part of our specification.

Our invention relates to a machine by which the silks are removed from corn which has been cut from the cob in preparation for canning or other uses.

The object of our invention is to produce such a machine of simple and mechanical construction with improved means for insuring the complete separation of the silks from the corn grains.

The advantages of our improved machine will appear as we proceed with our specification.

Figure 1:
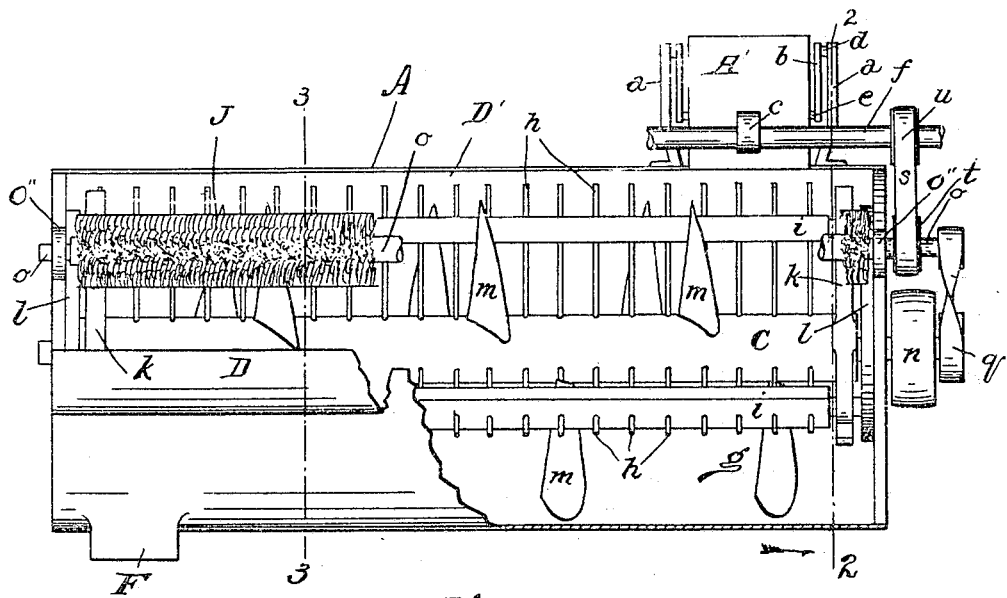
Figures 2, 3:
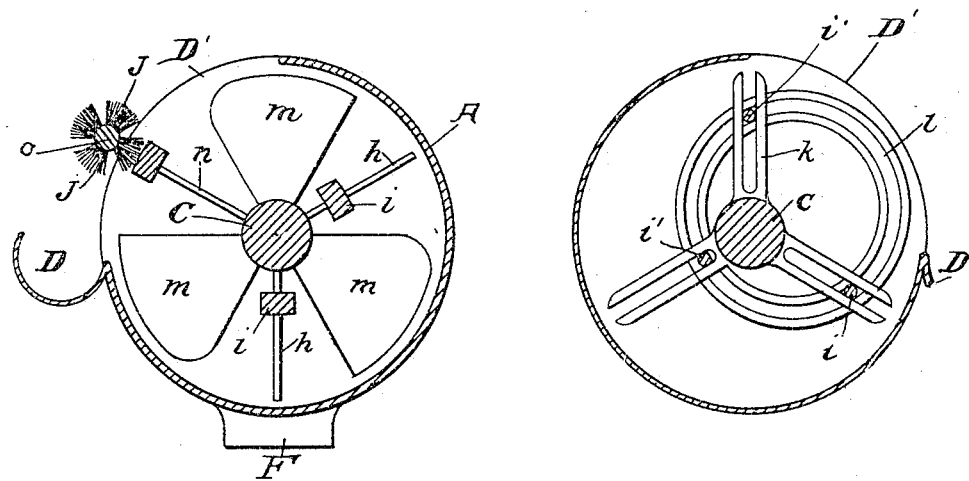

In the drawings, Figure 1 is a side elevation of our improved machine with part of the drum broken away to show the internal arrangement. Fig. 2 is a vertical section of Fig. 1 along the line 2 2 looking at it in the direction of the arrow. Fig. 3 is another vertical section along the line 3 3 with the mechanism in a slightly-different position, as will be described later.

Our improved machine consists of a long cylindrical drum A, closed at the ends, with an opening D' at one side near the top extending throughout its length, to the lower edge of which is secured a trough D to receive the silks that are removed from the corn, as will appear later. At one end of the drum is carried a hopper A' upon supports $a$ by means of arms $b$, which are pivoted, respectively, at opposite ends to the supports at $d$ and to the hopper at $e$. The hopper opens into the drum A and is adapted to be shaken by means of an eccentric $c$, secured to a shaft $f$.

A shaft C is supported in bearings at opposite ends of the drum A and carries radial arms $h$, arranged in rows, preferably three, at equal distances throughout the length of the shaft. These radial arms $h$ carry bars $i$, adapted to slide along their length. They are preferably coated with a smooth glossy material—such as brass, for example—which will enable them to readily slide through the corn. At the opposite ends of the shaft C spiders $k$ are rigidly secured. The arms of said spiders are slotted, and the bars $i$ are turned down so as to project through the slots in the arms of said spiders. The inner surfaces of the ends of the drums are provided with an annular groove $l$, eccentrically placed, and the ends $i''$ of the bars $i$ project into said grooves. It is thus apparent that as the shaft C is rotated, and with it the radial arms $h$, the bars $i$ will travel radially to and from the shaft C, said movement being controlled by the slots on the spider $k$ and the eccentrically-placed annular grooves $l$ at the ends of the drums. The radial arms thus passing through the grains of corn gather or comb the silks from the grains, and the bars $i$ strip the silks from said radial arms and carry them outwardly toward the outer periphery of the drum.

A rotary brush J, carried on a shaft $o$, which extends the length of the opening D' in the drum A, is suitably supported in bearings O'' at the ends of the drum A. This brush is arranged to turn in a direction opposite to that in which the shaft C rotates, and the movements of the parts are so related that a bar $i$ will arrive at the limit of its outward movement just as it reaches the brush, the brush thus in its rotation scraping off from the bar the collected silks, which fall into the trough D. (See Fig. 3.)

The shaft C is driven by the pulley $n$ in any convenient manner, and this shaft by means of a belt $q$ reversed causes the shaft $o$ to rotate in the opposite direction. A belt $s$, with pulleys $t$ and $u$, respectively, on shafts $o$ and $f$, causes the rotation of the shaft $f$.

The shaft C is provided with blades $m$, which are segments of a worm-blade. The rotation of the shaft through these blades thus causes the corn to be pushed or fed from one end of the drum A to the other, said drum being provided with an opening F at the bottom at that end opposite where the hopper is located, from which the corn falls after the silks have been removed. There being a number of arms $h$, the grains of corn are thus worked upon again and again by said arms and the removal of the silk thereby insured. At the same time the silk is removed after each operation of the bars $i$, being taken completely from the drum, and thorough cleaning of the grains of corn from the silk is secured.

We do not wish to limit ourselves to the particular mechanical arrangement shown and described; but What we do wish to claim as our invention, and secure by Letters Patent, is—

1. In a corn-silking machine, in combination with a drum, openings, at opposite ends to receive and discharge the corn, and means for conveying the corn from end to end of said drum, a rotating shaft, combing-arms carried thereby, stripper-bars adapted to travel longitudinally of said combing-arms, means for removing the silks from said stripper-bars when at the outer limit of their movement, and mechanism for operating the same, substantially as described.

2. In a corn-silking machine, in combination with the drum, the hopper located at one end at the top, and discharge-opening located at the other end at the bottom, and means for conveying the corn from one end to the other of said drum, a rotating shaft, combing-arms arranged in rows carried thereby, stripper-bars one for each row, adapted to travel lengthwise of said combing-arms, a rotating brush located without the drum adapted to brush off the silks from the stripper-bar, when the same is at the outer limit of its movement, and mechanism for operating the parts in the manner described.

3. In a corn-silking machine, a drum, a hopper located above one end of the same, a discharge-opening at the other end, a longitudinal opening in the periphery of the drum with a trough at the lower edge thereof, a rotating shaft having bearing in said drum, a series of combing-arms in rows secured to said shaft, stripper-bars extending lengthwise of the drum and adapted to slide on said combing-arms, radial slotted spiders secured to said shaft at opposite ends of the same, said stripper-bars having bearing in the slots of said spiders, eccentrically-displaced annular grooves on the inner faces of the ends of the drum receiving the ends of the stripper-bars, conveyer-blades secured to said shaft, a rotary brush extending the length of the drum and located above the opening in said drum, and mechanism for operating the parts in the manner described.

JOSEPH P. OWENS.
GEORGE COOPER.

Witnesses:
CLARENCE E. MEHLHOPE,
JOSEPH R. ROHRER.